United States Patent [19]

Möller et al.

[11] 4,195,241

[45] Mar. 25, 1980

[54] CONTACTLESS CONTROL PULSE GENERATOR FOR ROTARY MACHINE TIMING

[75] Inventors: Heinz Möller, Stuttgart; Joachim Hess, Ludwigsburg, both of Fed. Rep. of Germany

[73] Assignee: Robert Bosch GmbH, Stuttgart, Fed. Rep. of Germany

[21] Appl. No.: 833,030

[22] Filed: Sep. 14, 1977

[30] Foreign Application Priority Data

Oct. 16, 1976 [DE] Fed. Rep. of Germany ....... 2646887

[51] Int. Cl.[2] ............................................ H02K 19/20

[52] U.S. Cl. .............................. 310/168; 123/148 CC

[58] Field of Search ................................ 310/168-170, 310/171, 75 R, DIG. 3; 340/271; 324/174; 323/94 H; 322/47-50; 123/148 CC, 149 D

[56] References Cited

U.S. PATENT DOCUMENTS

| | | | |
|---|---|---|---|
| 2,117,018 | 5/1938 | Conrad | 310/169 |
| 2,117,019 | 5/1938 | Conrad | 310/169 |
| 2,221,814 | 11/1940 | Reid | 310/170 |
| 3,554,179 | 1/1971 | Burson | 123/148 CC |
| 3,572,106 | 3/1971 | Jonas | 310/168 |
| 3,809,040 | 5/1974 | Burson | 123/148 CC |
| 3,941,110 | 3/1976 | Sekiguchi | 123/148 CC |
| 4,074,669 | 2/1978 | Cavil | 123/148 CC |

FOREIGN PATENT DOCUMENTS

| | | | |
|---|---|---|---|
| 700932 | 12/1940 | Fed. Rep. of Germany | 310/162 |
| 2050121 | 4/1972 | Fed. Rep. of Germany | 310/168 |
| 2405382 | 8/1975 | Fed. Rep. of Germany | 123/148 CC |
| 1088106 | 10/1967 | United Kingdom | 310/168 |

*Primary Examiner*—R. Skudy

*Attorney, Agent, or Firm*—Frishauf, Holtz, Goodman & Woodward

[57] ABSTRACT

For generating control pulses for timing gasoline engine ignition, a rotor of magnetically conducting material with one or more notches in its edge cooperates with a stator also of magnetically conducting material having the configuration of a shallow U, of which the extremity of one leg presents a broad area to the narrow air gap between it and the edge of the rotor and the other leg presents essentially a knife edge. A magnet is mounted on the former leg and a pick-up device, such as a Hall generator, field plate, inductive winding or a reed switch is provided on the other leg to produce an electric signal in response to changes in magnetic flux. The passage of the notch by the broad area foot of the stator produces at most an insignificant change in flux, whereas passage of the notch by the other stator leg produces a sharp change in flux and hence a control pulse.

6 Claims, 1 Drawing Figure

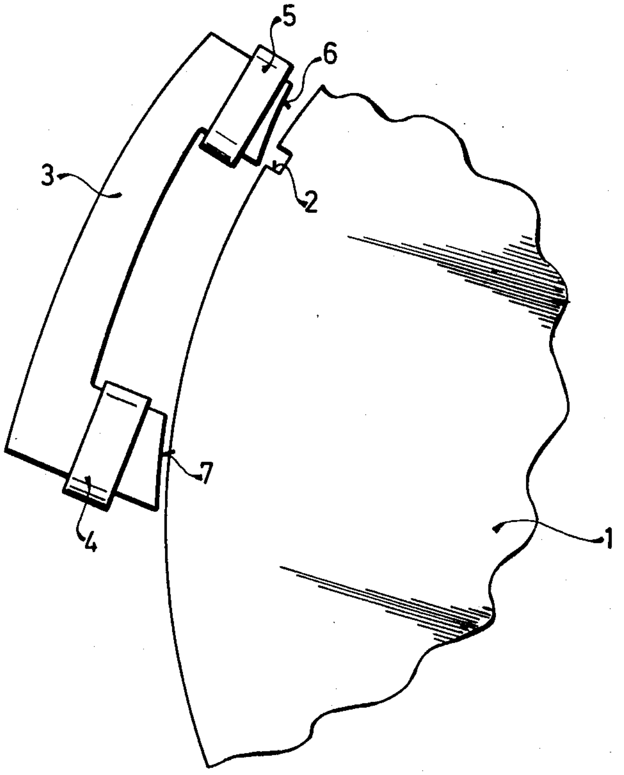
5
6
3
2
7
4
1

CONTACTLESS CONTROL PULSE GENERATOR FOR ROTARY MACHINE TIMING

This invention concerns a contactless control pulse generator for synchronizing electrically produced events with rotary movement in an engine or machine, as for example providing control pulses for timing the sparks produced by an elecrical ignition system of a gasoline engine.

More particularly, the invention relates to a magnetic and inductive pulse generating device in the general class of tachogenerators utilizing a rotor and a stator through both of which magnetic flux passes and a pick-up coil on the stator. For generating pulses for control of engine ignition without requiring electrical contacts between moving parts, a device has been known for some years in which a rotor having jag or teeth is used with a pick-up consisting of a magnet and an iron core equipped with an induction coil and serving as a stator cooperating with the rotor. The magnetic circuit in this case is closed through the rotor shaft. A pulse is then produced when a rotor tooth passes opposite to the stator. This arrangement has the disadvantage that a long flux path is present, which requires strong magnets. Shunt paths can readily produce false pulses in this arrangement. There is also the further disadvantage that a complicated stamped metal part is required for the rotor.

It is an object of the present invention to provide a contactless pulse generator suitable for timing engine ignition which can use a small magnet and provides a flux path that is less vulnerable to disturbance than in the previously known devices.

SUMMARY OF THE INVENTION

Briefly, a rotor made of magnetically conducting material is used with a piece of magnetically conducting material in the shape of a shallow U that is used as a stator to form a magnetic circuit with the rotor. On the stator a magnet and a device sensitive and responsive to a change in magnetic flux are mounted and the rotor has at least one irregularity on a portion thereof that passes by the stator for changing the magnetic resistance of the magnetic circuit. Preferably, the magnet and the pick-up device are spaced quite far from each other on the stator, for example on the respective two legs of the U. Preferably the feature on the rotor for varying the magnetic resistance of the circuit is a notch milled into it, although a projection can also be used. One of the legs of the U, preferably the one on which the magnet is mounted, is broader than a notch of the rotor, whereas the other approaches the rotor in a peaked transverse ridge, preferably produced by an obliquely cut end. Because of the shallow U shape of the stator, the flux path can be kept short and a relatively weak magnet can be used. The risk of disturbance by an occasional shunt flux path is mitigated. The milling of one or more notches in the rotor is an easy manufacturing procedure and the rotor blank can very easily be stamped from sheet metal. The wide spacing between the magnet and the pick-up element tends to avoid the formation of shunt magnetic paths of any significance. The broad area of the foot of one leg of the U which carries the magnet prevents the notch from creating a secondary pulse when it passes that leg of the stator.

The invention is further described by way of illustrative example with reference to the annexed drawing in the single FIGURE of which is a diagrammatic view, in the direction of the axis of the rotor, of the working portion of a control pulse generator according to the invention.

The drawing shows a portion of the rotor 1 having a notch 2 in its periphery. The stator 3 has the shape of a shallow U on one leg of which is provided a magnet 4 and on the other leg of which a pick-up element 5 is provided for converting changes in magnetic flux into an electrical signal. The foot 7 of the stator leg carrying the magnet 4 presents to the rotor a large end area of substantially constant (radial) distance from the rotor axis. The foot of the other leg of the stator that carries the pick-up element 5 presents a sharply peaked linear ridge running transversely to the rotor periphery. In the illustrated case this ridge is produced by the oblique cut of the face of the end of the stator opposite the periphery of the rotor. The profile of the peaked ridge in this case is of the sawtooth type, and the configuration of the end 6 of the stator leg may be described as being of cutting tool shape.

The magnetic flux produced by the magnet 4 passes through the foot 7 to and through the rotor 1 and then over to the foot 6 back into the stator 3. The yoke of the stator 3 closes the magnetic circuit. When, as the rotor turns, the notch 2 reaches the foot 7 of the stator 3 and passes by, the magnetic flux in the stator 3 is hardly changed because of the broad area of the foot 3 facing the rotor. In consequence, no signal is provided by the pick-up 5 in that case. When the notch 2 passes by the foot 6 of the stator 3, however, because of the sharp ridge configuration of the foot 6, a marked change in the flux takes place. Because of the high magnetic resistance that is produced at the greater air gap between the rotor notch 2 and the ridge peak of the foot 6, the pick-up element 5 produces a pulse caused by the reduction of the magnetic flux. For the pick-up element 5, there can be used, for example, a Hall generator, a field plate transducer, an inductive transducer or a magnetic Reed actuating a contact. It is possible to "tailor" the pulse amplitude and the pulse duration of the signals produced by the pick-up element 5 and the design of the shape of the notch 2, not only by "cut and try" methods, but also in accord with the assistance of calculation in accordance with well-known principles. For the concentration of flux in the circumferential direction, there can be used instead of the cutting tool shape of the foot 6 a ridge of symmetrical profile with the peak in the middle, for example. The stator could also be oriented to work with a radial groove in the face of the disk near the periphery. Instead of a notch, it can in many cases be convenient or advantageous to provide a projection on the circumference of the rotor 1 by which a pulse will be produced. In this case, it is convenient to provide a groove in the foot 7 wide and deep enough to allow the projection of the rotor to pass. The pulse produced by the passage of the projection past the foot 6 will, contrary to the example illustrated above, result from a transient increase of the magnetic flux in the stator 3. It will thus be seen that although the invention has been illustrated in detail with respect to a specific embodiment, variations and modifications are possible within the inventive concept.

We claim:

1. A contactless control pulse generator for synchronizing electrically produced events with rotary movement in a machine, comprising, in combination:

a rotor (1) having at least its peripheral region made of magnetically conducting material, a U-shaped stator (3) made of magnetically conducting material with its legs facing, adjacent to, and spaced by a gap from, the peripheral portion of said rotor (1), said stator being equipped with a magnet (4) and an electrical pick-up device (5) provided at different locations on said stator, said electrical pick-up device (5) of said stator (3) being constituted so as to produce an electrical signal in response to a change in magnetic flux in a magnetic circuit through said stator, said rotor having at least one irregularity (2) of a configuration and location suitable for producing, as the rotor rotates, a change in the magnetic resistance of the magnetic circuit through said stator and said rotor, and one of said stator legs having an end facing the rotor which is broader, in the circumferential direction, than said irregularity (2) of said rotor and the other of said stator legs presenting a peaked linear ridge to the air gap between it and the rotor, said linear ridge running substantially across the width of the periphery of the rotor.

2. A control pulse generator as defined in claim 1, in which said magnet (4) and said pick-up device (5) are widely spaced from each other on said stator (3) and said stator has the configuration of a shallow U.

3. A pulse generator as defined in claim 1, in which each said irregularity of said rotor is a notch running across the width of the periphery of the rotor.

4. A pulse generator as defined in claim 1, in which the end of said stator leg which presents said peaked linear ridge to said air gap has a cutting tool shape and the end of the other of said stator legs faces said rotor with a substantially cylindrical surface coaxial with the rotor.

5. A pulse generator as defined in claim 1, in which said magnet is located on one leg of said stator (3) and said pick-up device (5) is located on the other leg of said stator.

6. A pulse generator as defined in claim 5, in which the leg of said stator on which saig magnet is located presents a broad area end face to the air gap between it and said rotor and in which the leg on which said pick-up device is located is said leg which presents said peaked linear ridge to the air gap between it and said rotor.

* * * * *